United States Patent
Meunier

(10) Patent No.: US 9,469,414 B2
(45) Date of Patent: Oct. 18, 2016

(54) DEVICE FOR MONITORING THE STABILISATION OF THE APPROACH PHASE OF AN AIRCRAFT TO A LANDING RUNWAY, ASSOCIATED METHOD AND COMPUTER PROGRAM

(71) Applicant: THALES, Neuilly sur Seine (FR)

(72) Inventor: Hugues Meunier, Frouzins (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/554,175

(22) Filed: Nov. 26, 2014

(65) Prior Publication Data
US 2015/0307207 A1    Oct. 29, 2015

(30) Foreign Application Priority Data
Nov. 28, 2013  (FR) .................................. 13 02762

(51) Int. Cl.
| | | |
|---|---|---|
| B64D 43/02 | (2006.01) | |
| B64D 45/04 | (2006.01) | |
| G08G 5/02 | (2006.01) | |
| B62D 43/02 | (2006.01) | |
| G08G 5/00 | (2006.01) | |
| B64D 45/00 | (2006.01) | |

(52) U.S. Cl.
CPC .............. *B64D 45/04* (2013.01); *B62D 43/02* (2013.01); *G08G 5/02* (2013.01); *B64D 2045/008* (2013.01); *G08G 5/0021* (2013.01)

(58) Field of Classification Search
CPC ......... B64D 45/04; B64D 43/02; G08G 5/02
USPC .......................................................... 701/4
See application file for complete search history.

(56) References Cited

U.S. PATENT DOCUMENTS

| | | | | |
|---|---|---|---|---|
| 4,482,961 A | * | 11/1984 | Kilner | G05D 1/0083 244/183 |
| 6,600,977 B2 | * | 7/2003 | Johnson | G01C 5/005 340/967 |
| 7,068,187 B2 | * | 6/2006 | Ishihara | G05D 1/0676 340/945 |
| 7,206,674 B1 | * | 4/2007 | Statler | G06Q 50/30 244/184 |
| 8,116,923 B2 | | 2/2012 | Ishihara et al. | |
| 2014/0100720 A1 | * | 4/2014 | Fleiger-Holmes | G01S 1/18 701/4 |

FOREIGN PATENT DOCUMENTS

WO    WO 0216870    2/2002

* cited by examiner

*Primary Examiner* — Behrang Badii
*Assistant Examiner* — Michael Berns
(74) *Attorney, Agent, or Firm* — Davidson, Davidson & Kappel

(57) ABSTRACT

This monitoring device for monitoring the stabilization of the final approach phase of an aircraft to a landing runway includes:
an acquisiter for acquiring an instantaneous position of the aircraft,
a calculator for calculating an instantaneous distance between the instantaneous position of the aircraft, and a characteristic point of the landing runway,
a determiner for determining one or more variables relating to the aircraft, when said instantaneous distance is comprised between first and second predetermined distances, and
a generator for generating an alert signal, when at least one of said one or more variables is outside the boundary of a respective domain of values.
Each boundary depends on the instantaneous distance between the instantaneous position of the aircraft and the characteristic point of the landing runway.

13 Claims, 5 Drawing Sheets

DEVICE FOR MONITORING THE STABILISATION OF THE APPROACH PHASE OF AN AIRCRAFT TO A LANDING RUNWAY, ASSOCIATED METHOD AND COMPUTER PROGRAM

This claims the benefit of French Patent Application FR 13 027 62, filed Nov. 28, 2013 and hereby incorporated by reference herein.

The present invention relates to a monitoring device for monitoring the stabilisation of the final approach phase of an aircraft to a landing runway. The device comprises the acquisition means for acquiring an instantaneous position of the aircraft and calculating means for calculating an instantaneous distance between the instantaneous position of the aircraft and a characteristic point of the landing runway. The device further includes determination means for determining one or more variables relating to the aircraft, when said instantaneous distance is comprised between first and second predetermined distances. The monitoring device also comprises generation means for generating an alert signal, when at least one of said one or more variables is outside the boundary of a respective domain of values.

The invention also relates to a method for monitoring the stabilisation of the final approach phase of an aircraft to a landing runway, carried out by such a monitoring device.

The invention also relates to a computer program comprising software instructions that, when run by a computer, implement this method.

The phase of approaching the landing runway is a particularly important phase in terms of safety, because the landing phase of the aircraft is heavily dependent upon this prior approach phase, and a relatively large percentage of aircraft accidents and incidents tend to occur during the landing phase, including in particular runway overruns. Certain methods and devices have been envisaged in order to monitor the stabilisation of this approach phase, and as appropriate to generate an alert signal sent to the pilot or pilots of the aircraft, so as to limit the number of accidents or incidents during the landing of the aircraft.

BACKGROUND

For example, the document U.S. Pat. No. 8,116,923 B2 discloses a monitoring device and a monitoring method of the aforementioned type. Such a monitoring device extracts from a database a predetermined approach flight path angle towards the landing runway when the aircraft is in the approach phase, and determines whether a first difference between the position of the aircraft and the predetermined flight path angle is greater than a first predetermined threshold value.

The monitoring device then determines, when the first difference is greater than the first predetermined threshold value, whether a second difference between the angle of trajectory of the flight path of the aircraft and a predetermined angle of the approach flight path angle is greater than a second predetermined threshold value. The monitoring device then generates a system alert, directed to the crew of the aircraft and in particular to the pilot, warning of the approach phase instability when the second difference is greater than the second predetermined threshold value.

However, such a monitoring device only addresses a specific aspect of situations wherein the approach is not stabilised and thus generates a relatively large number of false alerts, also referred to as false alarms, which generally has a disturbing and disruptive effect on the crew of the aircraft. This is then quite likely to diminish the safety of the flight.

SUMMARY OF THE INVENTION

It is an object of the invention to provide a device and a method for monitoring the approach phase of the aircraft that characterises the various different situations of non-stabilisation in approach while also providing the ability to reduce the number of false alarms in order to best assist the crew of the aircraft in managing this approach phase, so as to ensure that the aircraft is optimally placed and operational during its landing phase with a view to minimising as far as possible the risk of accidents occurring during that time and thereby improving the safety of the flight. Indeed, an aircraft in approach mode that is not stabilised at a height above the landing runway generally between 1,000 feet and 400 feet is exposed to significant risks of being in an incident or accident situation when making its landing.

It is to be noted that the concept of stabilisation does not up to now have a standardised definition which has been recognised, validated and accepted by the skilled person in the art, and that the invention seeks to remedy this situation by providing a definition for this concept of stabilisation, apart from the technical solutions offered by this invention in conformity with this said definition. In accordance with the definition considered within the scope and context of this invention, an approach is considered to be stabilised if the variability of the different parameter or parameters to be checked and controlled during an approach, such as the parameters relative to the instantaneous position and situation of the aircraft relative to the approach flight path to be followed, the predicted position of the start of landing or the end of landing, progressively diminishes as the aircraft continues its advance towards the landing runway in the approach phase.

The present invention provides a device of the aforementioned type, for monitoring the stabilisation of the final approach phase of an aircraft to a landing runway, wherein each boundary depends on the instantaneous distance between the instantaneous position of the aircraft and the characteristic point of the landing runway.

According to other advantageous aspects of the invention, the monitoring device for monitoring the stabilisation of the final approach phase of an aircraft to a landing runway, performs said monitoring with regard to a current status of the aircraft relative to its approach flight path based on its progressive advancement towards the landing runway and includes one or more of the following characteristic features, taken into consideration individually or according to any technically possible combinations:

each boundary satisfies a monotonic function, such as a decreasing function, when the instantaneous distance between the instantaneous position of the aircraft and said characteristic point decreases;

the domain of values associated with a corresponding variable is an interval of values having extreme bounds and the differential gap between the extreme bound values, which form the boundary of said domain, decreases when the instantaneous distance between the instantaneous position of the aircraft and said characteristic point decreases;

the domain of values associated with a corresponding variable is an interval of values having extreme bounds, and the median value of the extreme bound values, which form the boundary of said domain, decreases when the instantaneous distance between the instantaneous position of the aircraft and said characteristic point decreases;

at least one determined variable is an element selected from the group consisting of: a current speed of the aircraft, a current flight path angle of the aircraft, a current attitude of the aircraft, a current heading of the aircraft, a current track of the aircraft, a localizer deviation of the aircraft relative to a predetermined approach axis to the landing runway, a current glide deviation of the aircraft relative to a predetermined approach axis to the landing runway, a X track lateral error of the aircraft relative to a predetermined approach axis to the landing runway, and a X track vertical error of the aircraft relative to a predetermined approach axis to the landing runway; and the domain associated with each variable is an interval of values having extreme bounds forming the boundary of said domain.

According to other advantageous aspects of the invention, the monitoring device for monitoring the stabilisation of the final approach phase of an aircraft carries out said monitoring in accordance with a prediction of a zone of initiation of the landing of the aircraft based on its progressive advancement towards the landing runway, and includes one or more of the following characteristic features, taken into consideration individually or according to any technically possible combinations:

at least one determined variable is selected from an estimated lateral position of ground impact by the aircraft, and one estimated longitudinal position of ground impact by the aircraft, the estimated lateral position of ground impact being determined along a direction perpendicular to a longitudinal axis of the landing runway and the estimated longitudinal position of ground impact being determined along a direction parallel to the longitudinal axis of the landing runway;

the domain associated with each determined variable is an interval of values having extreme bounds forming the boundary of said domain; and one determined variable is an estimated position of ground impact by the aircraft, the boundary of a domain associated with said variable is in the form of an ellipse having a semi-major axis and a semi-minor axis, and the semi-major axis and the semi-minor axis of the ellipse decrease when the instantaneous distance between the instantaneous position of the aircraft and said characteristic point decreases.

According to other advantageous aspects of the invention, the monitoring device for monitoring the stabilisation of the final approach phase of an aircraft carries out said monitoring in accordance with a prediction of a distance required in order to execute the landing of the aircraft based on its progressive advancement towards the landing runway, and includes one or more of the following characteristic features, taken into consideration individually or according to any technically possible combinations:

one determined variable is a prediction of the landing distance of the aircraft along a longitudinal axis of the landing runway relative to a reference point on said runway; and the domain associated with each determined variable is an interval of values having extreme bounds forming the boundary or boundaries of said domain.

The object of the invention also relates to a method for monitoring the stabilisation of the final approach phase of an aircraft to a landing runway, the method including the following steps:

acquiring of an instantaneous position of the aircraft;

calculation of an instantaneous distance between the instantaneous position of the aircraft, and a characteristic point of the landing runway;

determination of one or more variables relating to the aircraft, when said instantaneous distance is comprised between first and second predetermined distances;

generation of an alert signal, when at least one out of said one or more variables is outside the boundary of a respective domain of values, wherein each boundary depends on the instantaneous distance between the instantaneous position of the aircraft and the characteristic point of the landing runway.

According to another advantageous aspect of the invention, the method for monitoring the stabilisation of the final approach phase of an aircraft includes the following characteristic feature:

each boundary satisfies a monotonic function, such as a decreasing function, when the instantaneous distance between the instantaneous position of the aircraft and said characteristic point decreases.

The object of the invention also relates to a computer program comprising software instructions that, when run by a computer, implement the stabilisation monitoring method as defined here above.

BRIEF DESCRIPTION OF THE DRAWINGS

These characteristic features and advantages of the invention will become apparent upon reading the description which follows, given purely by way of non limiting example, and with reference made to the accompanying drawings, in which.

DETAILED DESCRIPTION

In a conventional manner in this present patent application, the term "substantially equal to" refers to a relationship of equivalence within plus or minus 10%.

In the following of the description, 1 Ft refers to one foot, equal to 0.3048 meter, 1 Nm refers to 1 nautical mile, equal to 1,852 meters, and 1 Kt refers to one knot, equal to 1852 m/h, that is 0.514 $ms^{-1}$.

Figure 1:
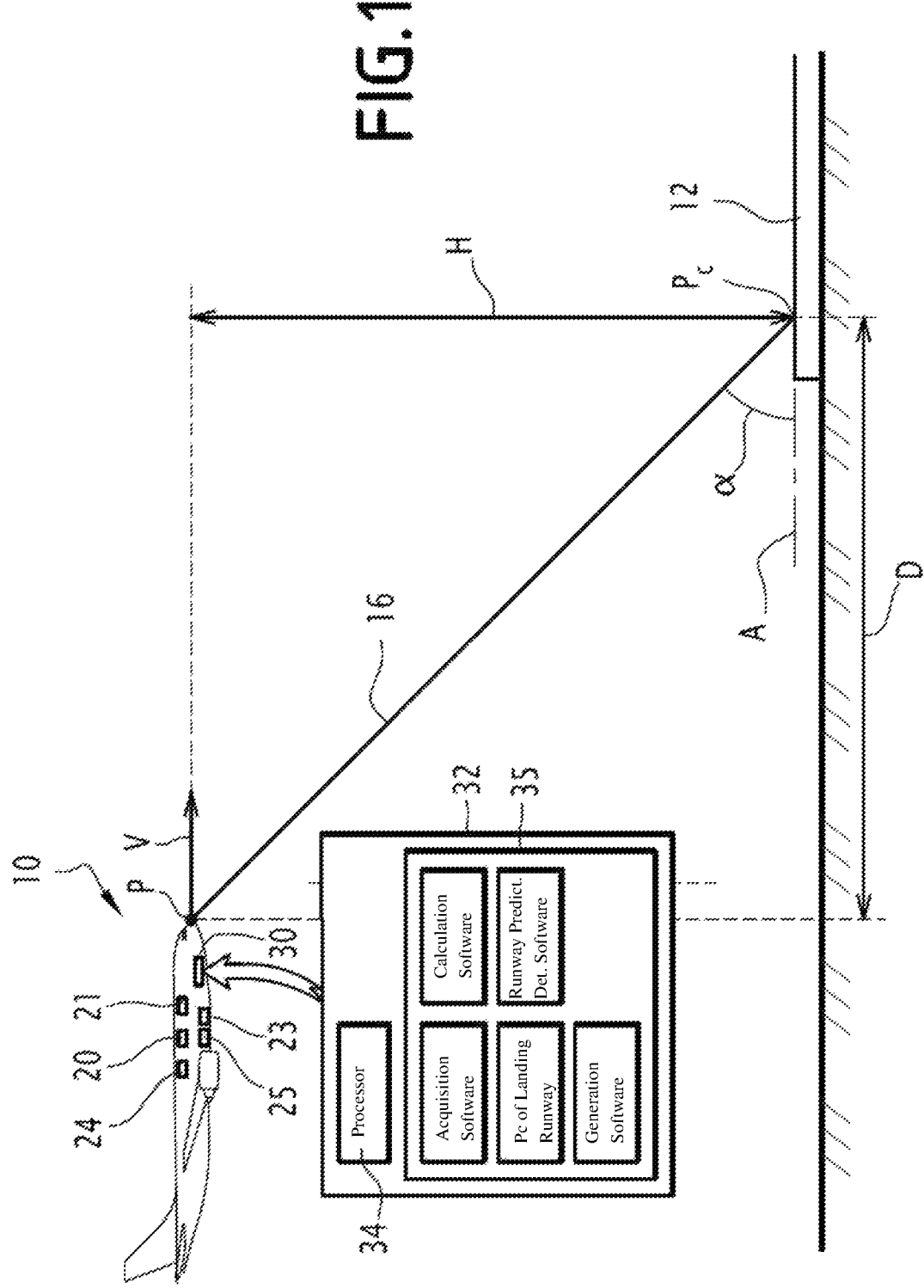
FIG. 1 is a schematic representation of an aircraft during the approach phase while approaching towards a landing runway, the aircraft including a monitoring device for monitoring the stabilisation of the final approach phase of an aircraft to a landing runway, the monitoring device comprising in particular the acquisition means for acquiring the avionics parameters, the computing means for calculating an instantaneous distance between the instantaneous position of the aircraft, and a characteristic point of the landing runway, the determination means for determining one or more variables relating to the aircraft, and the signal generation means for generating an alert signal, when at least one of said one or more variables is outside the bounds of a respective domain of values.
Figure 2:
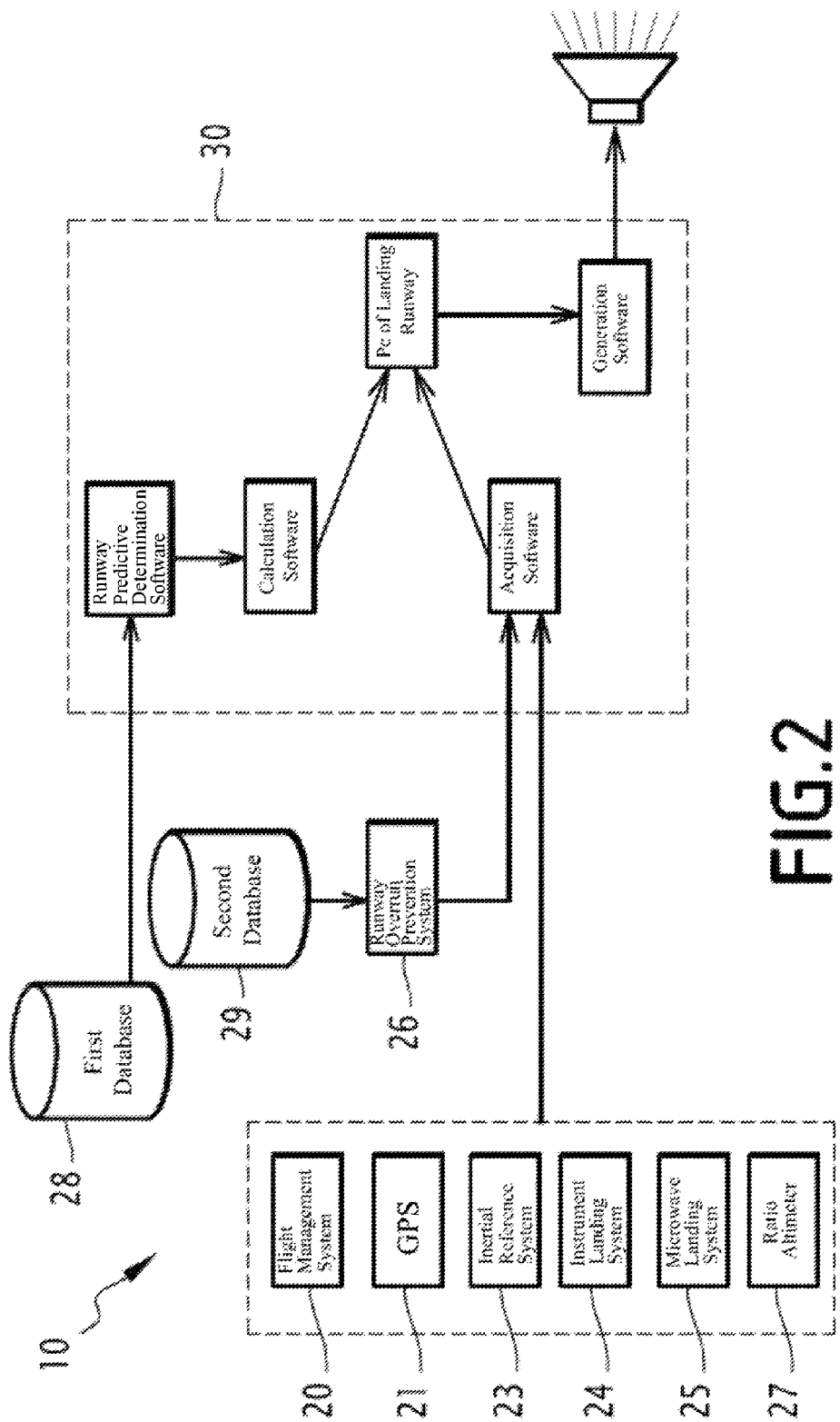
FIG. 2 is a more detailed representation of the monitoring device shown in FIG. 1, FIGS. 3 to 7 are schematic representations of the domains of values for various different variables relative to the aircraft determined by the monitoring device 1.

In FIG. 1, an aircraft 10 is in the approach phase towards a landing runway 12, and is capable of moving along a final approach axis 16 towards the landing runway 12.

The aircraft 10 has, relative to the terrestrial-ground reference frame, a current position P, also referred to as instantaneous position, as well as a current speed V, also referred to as instantaneous speed.

According to the mode of implementation of the invention, the aircraft 10 includes all or part of the following systems in order to provide the relevant parameters specific to the aircraft that are necessary for the implementation of the invention:

a flight management system 20 for managing the flight of the aircraft, also referred to as FMS, a satellite positioning system 21 for locating position via satellite such as a GPS system;

an inertial reference system 23, also referred to as IRS;

an instrument landing system ILS 24 or a microwave landing system MLS 25;

a system for preventing active runway overrun 26, also known as ROPS system (for Runway Overrun Prevention System);

a radio altimeter 27, also denoted as RA;

a first database 28 containing data pertaining to the various different runways relating to certain airports of one or more regions; and a second database 29 containing data pertaining to the performance elements primarily related to landing of the aircraft 10.

According to the invention, the aircraft 10 also includes a monitoring device 30 for monitoring stabilisation during its approach phase towards a landing runway 12.

The landing runway 12 is substantially planar, and defines a reference plane A.

The final approach axis 16 has an angle $\alpha$ relative to the reference plane A of the landing runway. The value of the angle $\alpha$, for example, equal to 3 degrees, and is advantageously provided by a database containing information elements on runways of various airports.

The various different avionics systems, namely the FMS 20, GPS 21 IRS 23, 24 ILS, MLS 25, ROPS 26 and RA 27, are known per se and are capable of supplying various avionics parameters monitoring device 30.

The avionics parameters in particular include:

the instantaneous position P of the aircraft 10, provided by the FMS 20 and/or the GPS 21;

the instantaneous speed V of the aircraft 10, provided by the FMS 20 and/or the GPS 21 and/or the IRS 23;

the instantaneous flight path angle FPA of the Aircraft 10, also referred to as current flight path angle and provided by the FMS 20 and/or the GPS 21;

the instantaneous attitude of the aircraft 10, also referred to as current attitude, and provided by the FMS 20 and/or the IRS 23;

an instantaneous heading of the aircraft 10, also referred to as current heading, and provided by the FMS 20 and/or the GPS 21 and/or the IRS 23;

an instantaneous track of the aircraft 10, also referred to as current track, and provided by the FMS 20 and/or the GPS 21 and/or the IRS 23;

a localizer deviation $\Delta$ of the aircraft 10 relative to the predetermined approach axis 16 towards the landing runway 12, provided by the ILS 24 and/or the MLS 25;

a current glide deviation of the aircraft 10 relative to the predetermined approach axis 16 towards the landing runway 12, provided by the ILS 24 and/or the MLS 25;

a X track lateral error of the aircraft 10 relative to the predetermined approach axis 16 towards the landing runway, provided by the FMS 20 and/or the GPS 21;

a X track vertical error of the aircraft 10 relative to the predetermined approach axis 16 towards the landing runway, provided by the FMS 20 and/or the GPS 21;

a prediction of the landing distance DA of the aircraft 10 along a longitudinal axis X of the landing runway 12 relative to a reference point Pr on said runway, this prediction being provided by the ROPS system 26 based on the data from the second database 29; and a radio altitude provided by the radio altimeter RA 27.

The monitoring device 30 includes at least one data processing unit 32, for example consisting of a processor 34 and a memory storage 35 associated with the processor 34.

The memory storage 35 is capable of storing an acquisition software 36 for acquiring at least one avionic parameter, including the instantaneous position P of the aircraft, a calculation software 37 for calculating an instantaneous distance D between the instantaneous position P of the aircraft and a characteristic point Pc of the landing runway 38 and a determination software for determining one or more variables relating to the aircraft 10, where the calculated instantaneous distance D is situated between the first D1 and the second D2 predetermined distances.

The term 'variable relating to the aircraft' refers to any variable associated with the aircraft that allows to monitor the stabilisation of the approach phase of the aircraft 10 towards the landing runway 12. Each variable relating to the aircraft is for example any of the avionics parameters such as defined above, with the exception of the instantaneous position P and the radio altitude, and provided by the FMS 20, the GPS 21, the IRS 23, the ILS 24, the MLS 25, the ROPS 26 and the RA 27 system.

The term 'determination of the relative variable' refers to the acquisition of this variable by means of one of the systems including FMS 20, GPS 21, IRS 23, ILS 24, MLS 25, ROPS 26 and RA 27, when said variable is directly provided by one of said systems 20, 21, 23, 24, 25, 26 and 27, or even the calculation of this variable when it is not directly provided by one of said systems 20, 21, 23, 24, 25, 26 and 27.

The memory storage 35 is capable of storing information elements relating to the landing runway 12, derived from the first database 28, such as the position of the characteristic point Pc of the landing runway, the position of the reference point Pr of said runway, these positions may possibly be identical and are determined in a terrestrial-ground reference frame.

In addition, the memory storage 35 is capable of storing a runway predictive determination software 39 for determining the landing runway on a predictive basis, as described in the document FR 2 783 912 A1.

The memory storage 35 is capable of storing a generation software 40 for generating an alert signal when at least one of said one or more variables is outside the boundary of a respective domain of values. The fact that at least one of said variables is outside the boundary of the domain of values that is associated therewith characterises a situation of non-stabilised approach of the aircraft 10, and alert is also referred to as non-stabilised approach alert.

Alternatively, the acquisition means 36, the calculating means 37, the determination means 38, the runway predictive determination means 39 and the generation means 40 are in the form of programmable logic components, or even in the form of dedicated integrated circuits.

The alert generated by the generation software 40 comprises an audible and/or visual signal in order to attract the attention of the crew of the aircraft 10, in particular the pilot or pilots, and to warn the crew about the situation of non-stabilised approach of the aircraft 10, so as to induce them to perform the necessary corrective actions.

The variables determined by the determination software 38 are preferably variables relating to the instantaneous position, or to an instantaneous path trajectory or to a predicted path trajectory or even to the predicted landing distance of the aircraft 10.

By way of example, a first determined variable is the current speed V of the aircraft.

A second determined variable is a current flight path angle FPA of the aircraft, that is to say the angle formed by the path trajectory followed by the aircraft 10 with a horizontal plane.

A third determined variable is a current attitude of the aircraft, that is to say the angle of the longitudinal axis of the aircraft 10 with the horizontal plane.

A fourth determined variable is a current heading of the aircraft, that is to say the angle of the longitudinal axis of the aircraft 10 with the North.

A fifth determined variable is a current track of the aircraft, that is to say the angle formed by the path trajectory followed by the aircraft 10 with the North.

A sixth determined variable is a current localizer deviation of the aircraft 10 relative to a predetermined or calculated approach axis to the landing runway 12, such as the final approach axis 16. The current localizer deviation is provided by a radio means, such as the MLS 24 or the ILS 25, or indeed calculated based on the position P of the aircraft 10, the direction of the axis of the landing runway 12 and the approach flight path angle of the aircraft 10 predetermined by the flight management system 20.

A seventh determined variable is a current glide deviation of the aircraft 10 relative to a predetermined or calculated approach axis to the landing runway 12, such as the final approach axis 16. The current glide deviation is provided by a radio means, such as the ILS 24 or the MLS 25, or indeed calculated based on the position P of the aircraft 10, the direction of the axis of the landing runway 12 and the approach flight path angle of the aircraft 10 predetermined by the flight management system 20.

An eighth determined variable is an X track lateral error of the aircraft 10 relative to a predetermined or calculated approach axis to the landing runway 12, such as the final approach axis 16.

A ninth determined variable is an X track vertical error of the aircraft 10 relative to a predetermined or calculated approach axis to the landing runway 12, such as the final approach axis 16.

Figure 7:
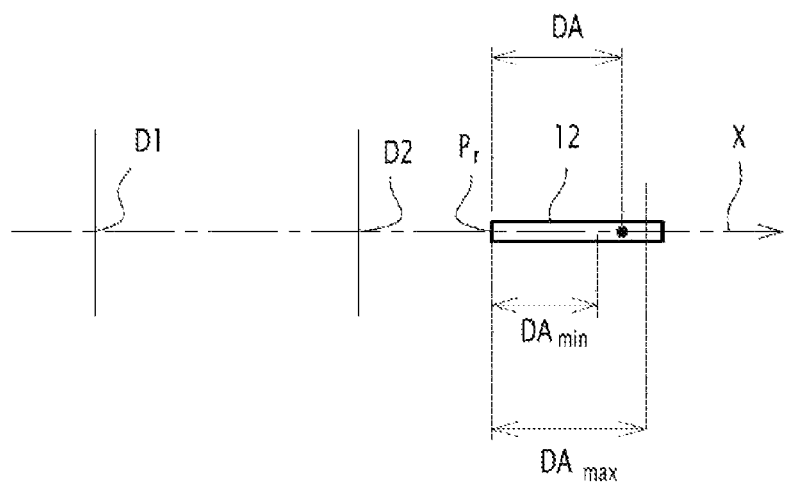

A tenth variable, which is provided by a system of the type like the ROPS 26 or indeed calculated by the monitoring device 30, is a prediction of the landing distance DA that will be used by the aircraft 10 along a longitudinal axis X of the landing runway 12 relative to a reference point Pr on said runway 12, such as the start of said runway 12, as represented in FIG. 7.

An eleventh variable is prediction of a point of intersection of the current path trajectory with the horizontal plane A containing the landing runway, this variable being supplied by a device for predicting said point of intersection, this point of intersection being sometimes known as the "point of impact". This intersection point prediction device is known per se, the latter being integrated into a collision warning system for warning about collision with the ground, also referred to as TAWS system (for Terrain Awareness Warning System). Alternatively, the eleventh variable is computed by the monitoring device 30. This estimated position of ground impact is in other words a prediction of the position of the point of impact of the current path trajectory extrapolated based on the instantaneous values of the aircraft parameters (mainly aircraft position, speed, aircraft track, radio altitude and roll) with the reference plane A of the landing runway 12.

A twelfth and a thirteenth variables are respectively an estimated lateral position of ground impact made by the aircraft 10 and an estimated longitudinal position of ground impact made by the aircraft 10, the estimated lateral position of ground impact being determined along a direction perpendicular to the longitudinal axis X of the landing runway 12 and the estimated longitudinal position of ground impact being determined along a direction parallel to the longitudinal axis X of the landing runway 12. In other words, the twelfth and thirteenth variables correspond to the projections of the eleventh variable along directions respectively perpendicular and parallel to the longitudinal axis X of the landing runway 12.

The position of the aircraft 10 taken into account in determining the distance D is, for example, the projection of the current position P in the reference plane A of the landing runway, and the distance D is then determined in said reference plane A relative to the predetermined characteristic point Pc of the landing runway 12, the characteristic point Pc being defined at the level of the first database 28. This is for example a runway threshold value or advantageously the nominal touchdown point on the path trajectory in the approach or landing phase, in general located 300 meters after the runway threshold. The first D1 and second D2 predetermined distances are determined in the same reference frame in relation to the same predetermined characteristic point Pc. The first distance D1 is, for example comprised between 7.5 Nm and 15.5 Nm, preferably substantially equal to 9.5 Nm. The second distance D2 is, for example comprised between 1.25 Nm and 3.5 Nm, preferably substantially equal to 1.5 Nm.

In other words, the monitored portion of the approach lays between the first and second distances D1 and D2 in relation to the characteristic point Pc of the landing runway 12 towards which the aircraft is directed.

Alternatively, the invention considers instead of the distances D, D1, D2, the instantaneous height H of the aircraft 10 relative to the landing runway 12 and the first H1 and second H2 predetermined heights relative to the landing runway 12. The instantaneous height H, the first and second predetermined heights H1, H2 are determined in the same reference frame as the distances D, D1, D2, and in relation to the same predetermined characteristic point Pc, the horizontal distances D, D1, D2 being determined in the reference plane A, while the heights H, H1, H2 are the distances determined along a vertical direction perpendicular to the reference plane A.

The first height H1 is for example comprised between 2500 Ft and 5000 Ft, preferably substantially equal to 3000 Ft. The second height H2 is for example comprised between 400 Ft and 1200 Ft, preferably substantially equal to 500 Ft. The skilled person in the art will note that the values of the first and second heights H1, H2 correspond to the values of the first and second distances D1, D2 with the standard value of the angle α equal to 3 degrees, between the final approach axis 16 and the reference plane A of the landing runway.

According to the invention, each domain boundary associated with the variable determined by the determination software 38 varies according to the distance D between the position of the aircraft 10 and the characteristic point Pc of the landing runway. In other words, each domain boundary is not a fixed boundary calculated in a predetermined manner.

According to the above variant embodiment, each domain boundary associated with a variable determined by the determination software 38 varies according to the height H between the P of the aircraft and the characteristic point Pc of the landing runway.

Each boundary preferably satisfies a monotonic function, that is to say an increasing function or a decreasing function, when said distance D and said height H decreases. Each boundary satisfies, more preferably, a decreasing function when said distance D or said height H decreases.

The domain of values associated with a corresponding variable is for example an interval of values having extreme bounds, as represented in the example shown in the FIGS. 3, 4, 5 and 7. The boundary of the domain is then formed by the extreme bounds of the interval of values, such as upper and lower bound values of the interval of values. The variation of the domain boundary then corresponds, for example, to a variation of the differential gap between said extreme bound values, when the distance D or the height H between the position of the aircraft 10 and said characteristic point Pc decreases. Preferably, this differential gap between said extreme bound values decreases when said distance D or said height H decreases.

In addition or alternatively, the variation of the boundary of the domain when it is in the form of an interval of values corresponds to a variation of the median value of the extreme bounds when the distance D or the height H between the position of the aircraft 10 and the characteristic point Pc of the landing runway decreases. Preferably, the median value of the extreme bound values decreases when said distance D or said height H decreases.

When the variable determined by the determination software 38 is a variable from amongst the first, second, third, fourth, fifth, sixth, seventh, eighth, ninth, tenth, twelfth and thirteenth variables as previously defined above, the domain of values associated with said determined variable is in the form of an interval of values having extreme bounds.

Figure 3:
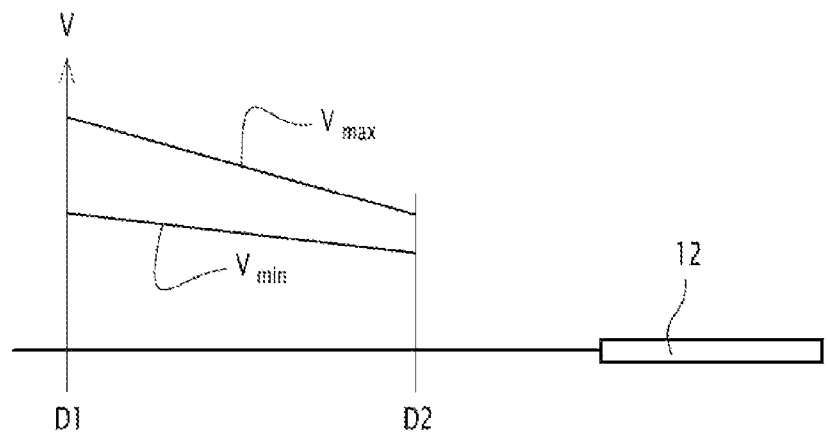

In the example of FIG. 3, the determined variable is the first variable, that is, the current speed V of the aircraft. The domain of values associated with the first determined variable V is defined by a maximum speed Vmax (function of D or advantageously of H) and a minimum speed Vmin (function of D or advantageously of H), the alert then is able to be generated by the generation software 40 when the current speed V is higher than the maximum speed Vmax or indeed lower than the minimum speed Vmin.

In the example of FIG. 3, the variation of the domain of values associated with the first variable V as a function of the distance D results in a linear decrease in the maximum speed Vmax and also in the minimum speed Vmin, when said distance D decreases. In this example, it is observed that there is both a decrease in the differential gap between the lower and upper bounds Vmin, Vmax of the interval of values for the current speed V and a decrease in the median value of said lower and upper bounds Vmin, Vmax when said distance D decreases. The maximum speed Vmax is, for example substantially equal to 250 Kt for the first distance D1 and is substantially equal to 160 Kt for the second distance D2, while linearly varying as a function of the distance D between the first and second distances D1, D2. The minimum speed Vmin is for example substantially equal to 150 Kt for the first distance D1 and is substantially equal to 120 Kt to the second distance D2, while linearly varying as a function of the distance D between the first and second distances D1, D2.

Figure 4:
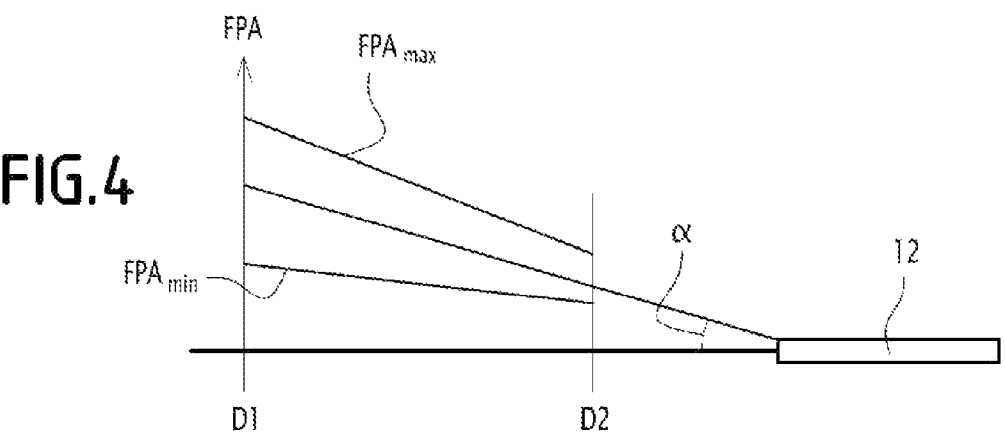

In the example of FIG. 4, the determined variable is the second determined variable, that is, the current flight path angle FPA of the aircraft. The domain of values associated with the second determined variable FPA is then defined by a maximum flight path angle FPAmax and a minimum flight path angle FPAmin, the alert then being able to be generated by the generation software 40 when the current flight path angle FPA is greater than the maximum flight path angle FPAmax or less than the minimum flight path angle FPAmin.

In the example of FIG. 4, the variation of the domain of values associated with the second variable FPA as a function of the distance D results, in a manner analogous to the Example shown in FIG. 3, in a linear decrease of the maximum flight path angle FPAmax, and also of the minimum flight path angle FPAmin when said distance D decreases. In this example, it is observed that there is both a reduction in the differential gap between the lower and upper bounds FPAmin, FPAmax of the interval of values for the current flight path angle FPA and a decrease in the median value of said lower and upper bounds FPAmin, FPAmax, when said distance D decreases. The maximum flight path angle FPAmax is for example equal to 3° for the first distance D1 and equal to 2.9° for the second distance D2, while linearly varying as a function of the distance D between the first and second distances D1, D2. The minimum flight path angle FPAmin is for example equal to 2.6° for the first distance D1 and equal to 2.7° for the second distance D2, while linearly varying as a function of the distance D between the distances D1, D2.

In the example of the third determined variable, that is the attitude of the aircraft 10, the maximum attitude is for example equal to 5.5° for the first distance D1 and equal to 5° for the second distance D2, and varies linearly as a function of the distance D between the first and second distances D1, D2. The minimum attitude is for example equal to 2.6° for the first distance D1 and equal to 2.7° for the second distance D2, and varies linearly as a function of the distance D between the first and second distances D1, D2.

In the example of the fourth determined variable, that is the current heading of the aircraft 10, the maximum left heading is for example, substantially equal to 15° for the first distance D1 and substantially equal to 5° for the second distance D2 and varies linearly as a function of the distance D between said first and second distances D1, D2. The maximum right heading is for example substantially equal to 15° for the first distance D1 and is substantially equal to 5° for the second distance D2, and varies linearly as a function of the distance D between the first and second distances D1, D2.

In the example of the fifth determined variable, that is the current track of the aircraft 10, the maximum left track is for example substantially equal to 15° for the first distance D1 and substantially equal to 5° for the second distance D2, and varies linearly as a function of the distance D between these first and second distances D1, D2. The maximum right track is for example substantially equal to 15° for the first distance D1 and substantially equal to 5° for the second distance D2, and varies linearly as a function of the distance D between the first and second distances D1, D2. In the example of embodiment shown in FIG. 5, wherein the aircraft 10 and the landing runway 12 are represented in top view, the determined variable is the sixth variable, that is, the current lateral angular deviation Δ of the aircraft relative to an approach axis to the landing runway 12, such as the final approach axis 16. The domain of values associated with the sixth determined variable Δ is defined by a maximum left horizontal deviation Δw and a maximum right horizontal deviation Δe, the alert then being able to be generated by the generation software 40 when the current localizer deviation Δ is greater to the left than the maximum left horizontal deviation Δw or indeed greater to the right than the maximum right horizontal deviation Δe.

The skilled person in the art will note that the current lateral deviation may also be measured in the form of a distance differential, and the associated domain of values is also in the form of an interval wherein the differential gap between the bounds decreases when the distance D decreases between the first and second distances D1, D2.

Figure 5:
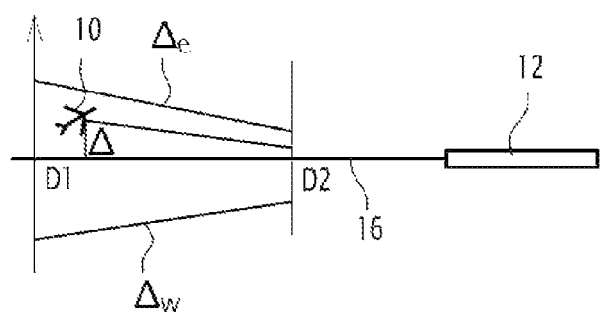

In the example of FIG. 5, the variation of the domain of values associated with the sixth variable Δ as a function of the distance D results in a linear decrease of the maximum left deviation Δw, and also of the maximum right deviation Δe when said distance D decreases. In this example, it is observed that there is both a decrease in the differential gap between the extreme bounds Δw, Δe of the interval of values for the current localizer deviation Δ and a decrease in the median value of said extreme bounds Δw, Δe when said distance D decreases.

In the example of the sixth determined variable, that is the current localizer deviation, the maximum left Δw and right Δe deviations are for example equal to 2 dots for the first distance D1 and equal to one dot for the second distance D2, with each varying linearly as a function of the distance D between the first and second distances D1, D2.

In the seventh example of the determined variable, that is, the current glide deviation, the maximum deviations at the top and at the bottom are for example equal to 2 dots for the first distance D1 and equal to one dot for the second distance D2, with each varying linearly as a function of the distance D between the first and second distances D1, D2. The skilled person in the art will note that the current vertical deviation may, in an analogous manner, possibly be measured in the form of a distance differential, and the associated domain of values is also in the form of an interval wherein the differential gap between the bounds decreases when the distance D decreases between the first and second distances D1, D2.

In the example of the eighth variable, that is, the X track lateral error of the aircraft, the maximum lateral deviation is for example substantially equal to 2 Nm for the first distance D1 and substantially equal to 0.5 Nm for the second distance D2, and varies linearly as a function of the distance D between the first and second distances D1, D2. The minimum lateral deviation is for example substantially equal to 0.5 Nm for the first distance D1 and substantially equal to 0.1 Nm for the second distance D2, while linearly varying as a function of the distance D between the first and second distances D1, D2.

In the example of the ninth determined variable, that is, the X track vertical error of the aircraft, the upper bound of the interval for this ninth variable is for example, substantially equal to 2500 Ft for the first distance D1 and is substantially equal to the 500 Ft for the second distance D2, and varies linearly as a function of the distance D between the first and second distances D1, D2. The lower bound of the interval for this ninth variable is for example, substantially equal to 1000 Ft for the first distance D1 and substantially equal to 200 Ft for the second distance D2, while linearly varying as a function of the distance D between the first and second distances D1, D2.

Figure 6:
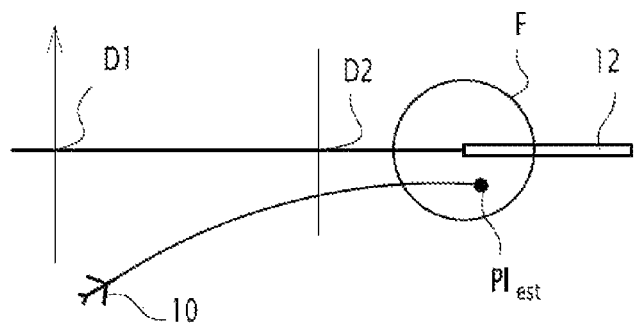

In the example of FIG. 6, the determined variable is the eleventh variable, that is, the estimated position PIest of ground impact by the aircraft 10, also known as a prediction of the position of the point of impact of the current path trajectory extrapolated with the reference plane A of the landing runway 12. The domain of values associated with the eleventh determined variable is then an area with a boundary F in the form of an ellipse having a semi major axis and a semi minor axis, the alert then being able to be generated by the generation software 40 when the estimated position of impact PIest is outside the area with the boundary F in the form of an ellipse.

In the example of FIG. 6, the variation of the domain of values associated with the eleventh variable PIest results in a decrease, preferably a linear decrease, in the values of the semi major axis and the semi minor axis of the ellipse when said distance D decreases.

The upper bound of the interval associated with the semi-major axis of the ellipse is, for example, substantially equal to 1000 m for the first distance D1 and substantially equal to 300 m for the second distance D2, and varies linearly as a function of the distance D between said first and second distances D1, D2. The lower bound of the interval associated with the semi-major axis is for example substantially equal to 500 m for the first distance D1 and substantially equal to 10 m for the second distance D2, while linearly varying as a function of the distance D between first and second distances D1, D2.

The upper bound of the interval associated with the semi-minor axis of the ellipse is, for example substantially equal to 2.5 Nm for the first distance D1 and substantially equal to 0.5 Nm for the second distance D2, and varies linearly as a function of the distance D between these first and second distances D1, D2. The lower bound of the interval associated with the semi minor axis is for example substantially equal to 1 Nm for the first distance D1 and substantially equal to 0.1 Nm for the second distance D2, while linearly varying as a function of the distance D between said first and second distances D1, D2.

In the example of the twelfth determined variable, that is, the estimated lateral position of ground impact by the aircraft, the upper bound of the interval associated with this twelfth variable is for example substantially equal to 2.5 Nm for the first distance D1 and substantially equal to 0.5 Nm for the second distance D2, and varies linearly as a function of the distance D between these first and second distances D1, D2. The lower bound of the interval associated with this twelfth variable is for example substantially equal to 1 Nm for the first distance D1 and substantially equal to 0.1 Nm for the second distance D2, while linearly varying as a function of the distance D between said first and second distances D1, D2.

In the example of the thirteenth determined variable, that is, the estimated longitudinal position of ground impact by the aircraft, the upper bound of the interval associated with this thirteenth variable is for example substantially equal to 1000 m for the first distance D1 and substantially equal to 300 m for the second distance D2, and varies linearly as a function of the distance D between these first and second distances D1, D2. The lower bound of the interval associated with this thirteenth variable is for example substantially equal to 500 m for the first distance D1 and substantially equal to 10 m for the second distance D2, while linearly varying as a function of the distance D between these first and second distances D1, D2.

In the example of FIG. 7, the determined variable is the tenth variable, that is, the prediction of the landing distance DA of the aircraft 10 along the longitudinal axis X of the landing runway 12 relative to the reference point Pr of said runway 12, such as the start of said runway 12. The domain of values associated with the tenth determined variable DA is defined by the differential gap between a maximum landing distance DAmax and a minimum landing distance DAmin determined based on a series of successive predictions, the alert then being able to be generated by the generation software 40 when the estimated landing distance DA is greater than the maximum landing distance DAmax or indeed less than the minimum landing distance DAmin.

In the example of FIG. 7, the variation of the domain of values associated with the tenth variable DA as a function of the distance D results in a decrease, preferably a linear decrease, of the differential gap between the maximum landing distance DAmax and the minimum landing distance DAmin determined following a series of successive predictions on a predetermined time period of a few seconds (for example from a fraction of a second to about one minute, typically 10 seconds), when said distance D between the position of the aircraft 10 and said characteristic point Pc decreases. It is observed that there is a decrease of the differential gap between the lower and upper bounds DAmin, DAmax of the interval of values for the estimated landing distance DA and/or advantageously a decrease in the median value of said lower and upper bounds DAmin, DAmax, when said distance D between the position of the aircraft 10 and said characteristic point Pc decreases. The difference between the maximum landing distance DAmax and minimum landing distance DAmin is for example comprised between 300 m and 500 m for the first distance D1 and between 30 m and 50 m for the second distance D2, this difference varying linearly as a function of the distance D between the first and second distances D1, D2, thus characterising a reduction in the variability of the predicted landing distance, and de facto a stabilisation of the prediction of the distance required for the landing.

Figure 8:
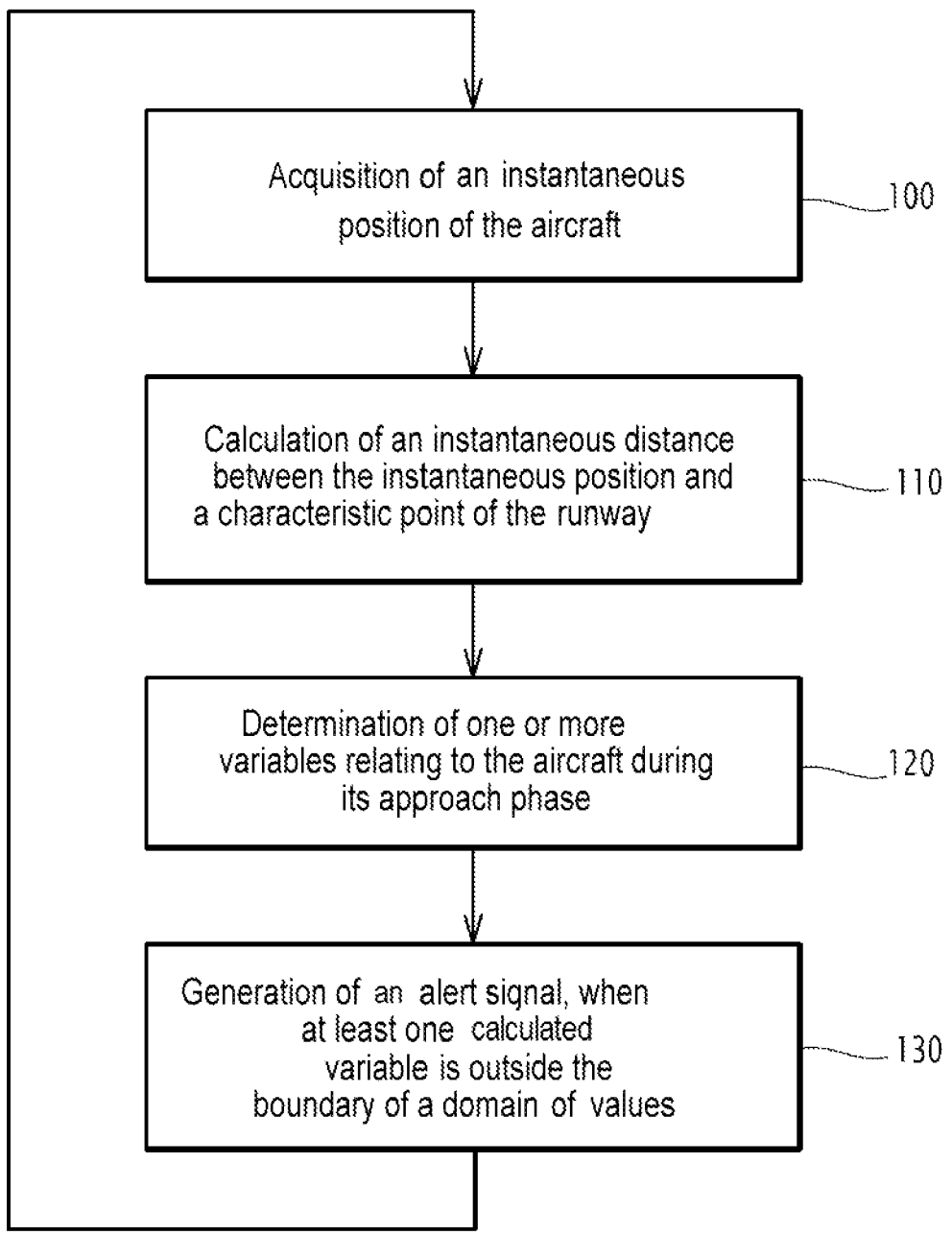
FIG. 8 is a flowchart of a stabilisation monitoring method according to the invention.

The operation of the invention will now be described making use of FIG. 8 representing a flowchart of the method for monitoring the stabilisation of the aircraft during the approach phase according to the invention.

During a step 100, the instantaneous position P of the aircraft is acquired by the monitoring device 30 by means of its acquisition software 36. The instantaneous position P is provided by the FMS 20 and/or the GPS 21.

The instantaneous distance D between the instantaneous position P, acquired during the step 100, and the characteristic point Pc of the landing runway is then calculated during the step 110 by the calculation software 37 included in the monitoring device 30. The characteristic point Pc of the landing runway is for example predetermined and stored in the memory storage 35 of the monitoring device. Alternatively, the landing runway 12 and the associated characteristic point Pc are determined in a predictive manner by making use of the determination software 39.

During the step 120, when the distance D between the position of the aircraft 10 and the characteristic point Pc is comprised between the first and second predetermined distances D1, D2, the monitoring device 30 determines, by making use of its determination software 38 one or more variables relating to the aircraft 10, such as one of the seven variables previously defined above.

The monitoring device 30 then analyses, during a step 130, if at least one of said one or more variables determined during step 120 is outside the boundary of the domain of values associated with the corresponding variable. Where necessary, if at least one of the determined variables is detected outside the domain of values associated therewith, the generation software 40 then generates the alert signal in order to warn the crew about the situation of non-stabilised approach of the aircraft 10, so as to induce them to perform the necessary corrective actions.

After the step 130, the method returns to the step 100 so as to acquire a new instantaneous position P of the aircraft 10, and to repeat the steps 110 to 130, in order to determine the value of said variable or variables for the new instantaneous position of the aircraft and to generate if so needed the alert signal. The skilled person in the art will observe that the boundary of the domain of values associated with each variable taken into account is recalculated at each iteration of the step 130, it being given that the boundary depends on the instantaneous distance D between the instantaneous position P of the aircraft and the characteristic point Pc of the landing runway 12.

The skilled person in the art will of course understand that multiple variables from among the thirteen variables previously defined above can be taken into consideration in parallel to improve the efficiency of the monitoring device 30 detecting a best non-stabilised approach of the aircraft 10.

Thus, the monitoring device 30 and the stabilisation monitoring method for monitoring the stabilisation according to the invention provide the ability to progressively reduce the uncertainty about the determined variables as the distance D between the position of the aircraft 10 and the characteristic point Pc of the landing runway decreases, that is to say, as the aircraft 10 is progressively approaching closer to the landing runway 12, whereas with the monitoring device of the state of the art this uncertainty level is fixed and does not vary, the latter being a function of the predetermined threshold values.

The monitoring device 30 and the stabilisation monitoring method according to the invention make it possible to reduce the number of false alarms in order to best assist the crew of the aircraft in managing this approach phase, and thereby improve the safety of the flight.

What is claimed is:

1. A monitoring device for monitoring the stabilisation of the final approach phase of an aircraft to a landing runway, the device comprising: acquisition means for acquiring an instantaneous position of the aircraft, calculating means for calculating an instantaneous distance between the instantaneous position of the aircraft, and a characteristic point of the landing runway, determination means for determining one or more variables relating to the aircraft, when said instantaneous distance is comprised between first and second predetermined distances, generation means for generating an alert signal, when at least one of said one or more variables is outside a boundary of a respective domain of values, wherein one or more boundaries are associated with each of the one or more variables, wherein each boundary depends on the instantaneous distance between the instantaneous position of the aircraft and the characteristic point of the landing runway, wherein each boundary satisfies a monotonic function when the instantaneous distance between the instantaneous position of the aircraft and the characteristic point decreases.

2. The device as recited in claim 1 wherein the monotonic function is a decreasing function of the boundary of the domain when the instantaneous distance between the instantaneous position of the aircraft and said characteristic point decreases.

3. The device as recited in claim 1 wherein the domain of values associated with a corresponding variable is an interval of values having extreme bounds and the differential gap between the extreme bound values, which form the boundary of said domain, decreases when the instantaneous distance between the instantaneous position of the aircraft and said characteristic point decreases.

4. The device as recited in claim 1 wherein the domain of values associated with a corresponding variable is an interval of values having extreme bounds, and the median value of the extreme bound values, which form the boundary of said domain, decreases when the instantaneous distance between the instantaneous position of the aircraft and said characteristic point decreases.

5. The device as recited in claim 1 wherein at least one determined variable is an element selected from the group consisting of: a current speed of the aircraft, a current flight path angle of the aircraft, a current attitude of the aircraft, a current heading of the aircraft, a current track of the aircraft, a localizer deviation of the aircraft relative to a predetermined approach axis to the landing runway, a current glide deviation of the aircraft relative to a predetermined approach axis to the landing runway, a X track lateral error of the aircraft relative to a predetermined approach axis to the landing runway and a X track vertical error of the aircraft relative to a predetermined approach axis to the landing runway.

6. The device as recited in claim 5 wherein the domain associated with each determined variable is an interval of values having extreme bounds forming the boundary of said domain.

7. The device as recited in claim 1 wherein one determined variable is a prediction of the landing distance of the aircraft along a longitudinal axis of the landing runway relative to a reference point on the landing runway.

8. The device as recited in claim 1 wherein at least one determined variable is selected from an estimated lateral position of ground impact by the aircraft, and one estimated longitudinal position of ground impact by the aircraft, the estimated lateral position of ground impact being determined along a direction perpendicular to a longitudinal axis of the landing runway and the estimated longitudinal position of ground impact being determined along a direction parallel to the longitudinal axis of the landing runway.

9. The device as recited in claim 1 wherein one determined variable is an estimated position of ground impact by the aircraft, the boundary of a domain associated with said variable is in the form of an ellipse having a semi-major axis and a semi-minor axis, and the semi-major axis and the semi-minor axis of the ellipse decrease when the instantaneous distance between the instantaneous position of the aircraft and said characteristic point decreases.

10. A method for monitoring the stabilisation of the final approach phase of an aircraft to a landing runway, the method comprising the following steps: acquiring an instantaneous position of the aircraft, calculating an instantaneous distance, between the instantaneous position of the aircraft and a characteristic point of the landing runway, determining one or more variables relating to the aircraft, when said instantaneous distance is comprised between first and second predetermined distances, generating an alert signal, when at least one out of said one or more variables is outside a boundary of a respective domain of values, wherein one or more boundaries are associated with each of the one or more variables, wherein each boundary depends on the instantaneous distance between the instantaneous position of the aircraft and the characteristic point of the landing runway, wherein each boundary satisfies a monotonic function, when the instantaneous distance between the instantaneous position of the aircraft and the characteristic point decreases.

11. The method as recited in claim 10 wherein the monotonic function is a decreasing function of the boundary of the domain when the instantaneous distance between the instantaneous position of the aircraft and said characteristic point decreases.

12. A monitoring device for monitoring the stabilisation of the final approach phase of an aircraft to a landing runway, the device comprising: an acquisitor for acquiring an instantaneous position of the aircraft, a calculator for calculating an instantaneous distance between the instantaneous position of the aircraft, and a characteristic point of the landing runway, a determinator for determining one or more variables relating to the aircraft, when said instantaneous distance is comprised between first and second predetermined distances, and a generator for generating an alert signal, when at least one of said one or more variables is outside a boundary of a respective domain of values, wherein one or more boundaries are associated with each of the one or more variables, wherein each boundary depends on the instantaneous distance between the instantaneous position of the aircraft and the characteristic point of the landing runway, wherein each boundary satisfies a monotonic function when the instantaneous distance between the instantaneous position of the aircraft and the characteristic point decreases.

13. The method as recited in claim 12 wherein the monotonic function is a decreasing function of the boundary of the domain when the instantaneous distance between the instantaneous position of the aircraft and said characteristic point decreases.

* * * * *